Aug. 26, 1930.  W. H. WHARTON  1,774,047
LOG TRANSFERRING DEVICE
Filed July 24, 1929
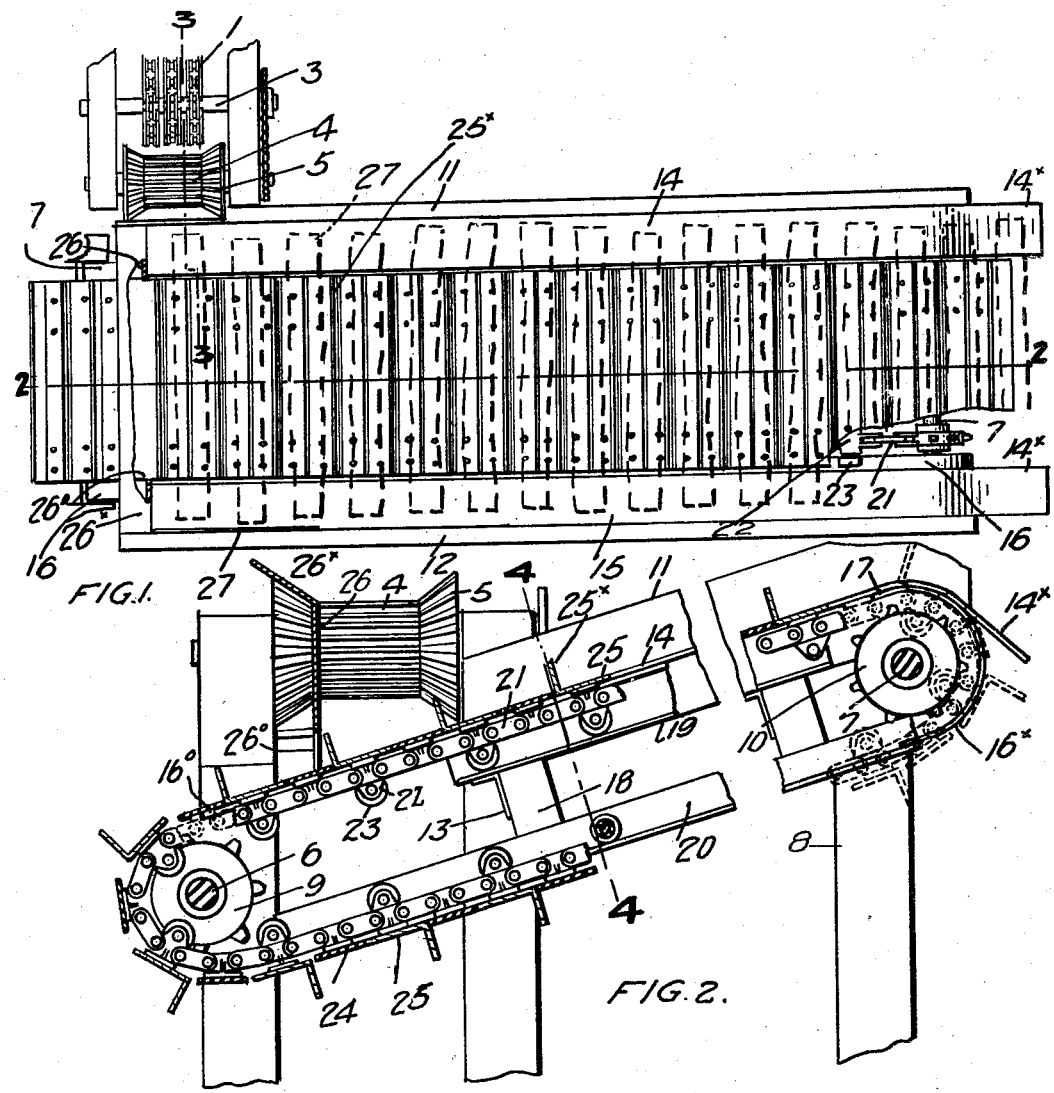
FIG.1.
FIG.2.
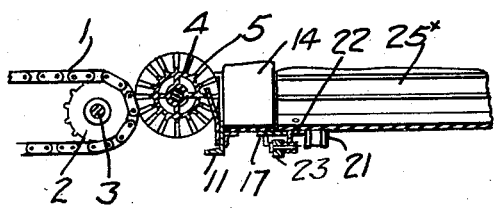
FIG.3.
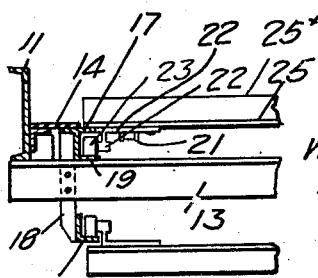
FIG.4.
INVENTOR
W. H. WHARTON.
BY
ATTORNEYS.

Patented Aug. 26, 1930

1,774,047

UNITED STATES PATENT OFFICE

WILLIAM HENRY WHARTON, OF TORONTO, ONTARIO, CANADA

LOG-TRANSFERRING DEVICE

Application filed July 24, 1929. Serial No. 380,696.

My invention relates to improvements in log transferring devices, and the object of the invention is to devise a transferring device by which the log travel may be altered in direction without displacing them from their original position or a position parallel to themselves and thereby avoid tangling or criss-crossing of the logs at the turning or corner at which the direction of travel is changed, and at the same time separating the logs apart so that they travel and are discharged in a parallel position, and at the same time devise a device in which friction will be reduced to a minimum thereby reducing consumption of power also to the minimum necessary to perform the operation, and it consists essentially of the arrangement and construction of parts as hereinafter more particularly explained.

Fig. 1 is a plan view of my device.

Fig. 2 is an enlarged longitudinal sectional view through Fig. 1 taken on line 2—2 and broken away intermediately of its length.

Fig. 3 is a transverse section on line 3—3 Fig. 1.

Fig. 4 is a transverse section on line 4—4, Fig. 2.

In the drawings like characters of reference indicate corresponding parts in each figure.

1 indicates a main endless conveyor upon which the logs are carried longitudinally from their source of supply. The conveyor 1 is in the form of an endless chain carried on sprocket wheels 2 secured to shafts 3, one of which only is shown.

4 is a drum provided with cone-frustum shaped ends 5. The drum is in the form of a corrugated or toothed drum, that is the teeth extending longitudinally of the drum and its cone-frustum ends or in the form of a drum having a serrated or roughened surface or any surface which will provide maximum frictional contact with the log as it passes thereover so as to grip the same and feed it forward. The drum 4 is driven from the conveyor shaft or from any other suitable source so as to revolve at a much higher speed than the travel of the conveyor 1.

A troughed conveyor which I will now describe extends in a direction at right angles to the main conveyor 1 and in a position to receive the logs.

6 and 7 are shafts journalled on a suitable supporting structure such as indicated at 8 and in proximity to each end of which are secured sprocket wheels 9 and 10. 11 and 12 are the side bars of the troughed conveyor frame, such side bars being preferably in the form of channel bars which are connected transversely by the transverse angle bars 13. 14 and 15 are bearing plates bracketed or otherwise suitably secured to the side bars 11 and 12 and extending inwardly therefrom at a point intermediate of their height.

16 and 17 are metallic guide strips which are secured to the plates 14 and 15 extending inwardly therefrom as clearly indicated in Fig. 4. The upper end of each strip 16 is curved concentrically to the centre of the shaft 7 as indicated at 16$^x$, the opposite or lower end of each strip terminating directly above the centre of the shaft 6 as indicated at 16°, see Fig. 2.

18 are hangers depending from the strips 16 and 17 from which are supported upper and lower channel guides 19 and 20. The upper guide 19 is also carried upon the transverse bars 13 so as to increase the support to carry the load as the logs are passed upward by the conveyor.

The troughed conveyor consists of a pair of endless chains 21 certain links of which are provided with brackets 22 in which are journalled rollers 23 the lower peripheral portion of which engage with the guide 19 as the conveyor travels upward the opposite peripheral portion of the rollers engaging the guideway 20 as the conveyor passes downward. 24 and 25 are plates which are secured to the alternate link of the chains 21 alternately one with the other, the plates 25 being provided with right angular flanges 25× extending from the lower edge of the plate so as to form the plate 25 into a trough for conveying the logs 26 as indicated by dotted lines in Fig. 1.

The bearing plates 14 and 15 are provided at their upper ends with downwardly and outwardly inclined extensions 14× for a purpose which will hereinafter appear. 26 is a plate suitably supported so as to extend across the trough conveyor in proximity to its lower end and in alignment with the left hand end of the centre portion of the drum 4. The plate 26 is provided with an outwardly inclined upper end 26× and an opening 26° for permitting the passage of the flanged portions 25× of the plates 25. 27 is a bumper plate which is secured to the side bars 12 directly opposite the drum 4 and against which the logs impact as they are discharged on to the conveyor by the drum 4.

Having described the particular parts involved in my invention I will briefly describe the operation of the same.

The logs are placed upon the conveyor 1 at their source of supply in a position extending longitudinally of the conveyor. In this way they are fed forward to the drum 4. The drum 4 revolving at a high speed grips the log as it is received by its frictional surface and impels it forward so as to throw it longitudinally over the trough conveyor until its forward end strikes the bumper plate 26×. The log then drops onto the trough conveyor so as to enter one of the troughs formed by the plate 25 and flange 25×, the log being engaged by said flange so as to align it transversely. The end portions of the logs as they are carried up by the trough conveyor bear upon the bearing plates 14 and 15 as clearly indicated in Fig. 1 so that the major portion of the weight is relieved from the conveyor. The flanges 25× engaging the logs draw the logs upwards until they reach the upper end of the conveyor. The outwardly inclined portions 14× of the plates 14 and 15 and over which the ends of the logs travel draw the logs out of engagement with the flanges 25× carrying them clear of the trough conveyor so that they discharge freely on to a pile or receptacle into which they are fed.

By means of this construction the friction in the trough conveyor is reduced to a minimum so that the logs travel upward continuously and evenly. Also by means of the discharging drum 4 the direction of travel of the logs is altered without changing their position and therefore there is no danger of their becoming tangled at the point where they change direction and thereby clogging the apparatus.

It may also be pointed out that by reason of the drum 21 revolving at a high speed in relation to the conveyor 1 when two logs are travelling longitudinally upon the conveyor 1, one log being slightly ahead of the other, the log ahead is first gripped by the drum and is shot forward onto the trough conveyor thereby separating it from its following log so that practically all the logs are fed up the trough conveyor one at a time thereby further eliminating any danger of confusion or tangling of the logs.

From this description it will be seen that I have devised a very simple device whereby logs are transferred along paths extending at right angles one with the other from the point of feed to the point of discharge without any danger of the logs tangling or crisscrossing. It will be readily understood that where two ordinary conveyors are employed one extending at right angles to the other, that as the logs are fed from one conveyor onto the other, they are more or less piled one on top of the other in all positions at the point of change of direction of the logs travel and thereby prevent any easy feeding of the mechanism, discharging them in a confused mass, increasing the power necessary to drive the conveyor and preventing any possibility of their being piled evenly when discharged from the discharging point.

What I claim as my invention is:—

1. In a log transferring device, the combination with a main conveyor extending from a source of log supply and upon which logs are fed longitudinally, an upwardly inclined troughed conveyor extending at right angles to the main conveyor, and means for automatically engaging each log as it is discharged from the main conveyor and impelling it forward longitudinally at a speed greater than that of the main conveyor to drop into the troughs of the troughed conveyor.

2. In a log transferring device, the combination with a main conveyor upon which logs are conveyed from their source of supply and in a position longitudinally thereof, of an upwardly inclined troughed conveyor extending at right angles to the main conveyor and extending transversely of the discharge end of the main conveyor, and a relatively high speed drum mounted between the main conveyor and the troughed conveyor and adapted to engage each log as it is fed from the main conveyor to impel it forward into the troughs of the troughed conveyor.

3. In a log transferring device, the combination with a main conveyor upon which logs are conveyed from their source of supply and in a position longitudinally thereof, of an upwardly inclined troughed conveyor extending at right angles to the main conveyor and extending transversely of the discharge end of the main conveyor, and a relatively high speed drum mounted between the main conveyor and the trough conveyor and adapted to engage each log as it is fed from the main conveyor to impel it forward into the troughs of the troughed conveyor, a bumper plate against which the forward ends of the logs have impact as they are discharged by the high speed drum so as to drop into the troughs of the troughed conveyor transversely thereof.

4. A log transferring device comprising a main conveyor, a suitably driven high speed drum at the discharge end of the main conveyor and over which the logs are fed, and a conveyor extending at right angles to the main conveyor and onto which the logs are fed by the aforesaid drum, such conveyor comprising side bars, bearing plates extending inward from each side bar and on which the end portions of the logs bear, and an endless conveyor member mounted between the bearing plates and on which the central portions of the logs bear so as to be carried upward thereby.

5. A log transferring device comprising a main conveyor, a suitably driven high speed drum at the discharge end of the main conveyor and over which the logs are fed, and a troughed conveyor extending at right angles to the main conveyor and onto which the logs are fed by the aforesaid drum, such troughed conveyor comprising side bars, bearing plates extending inward from each side bar and on which the end portions of the logs bear, and an endless troughed conveyor mounted between the bearing plates and into which the central portions of the logs fit so as to be carried upward thereby, and means for freeing the logs from the troughed conveyor as they are discharged at the discharge end thereof.

6. A log transferring device comprising a main conveyor, a suitably driven high speed drum at the discharge end of the main conveyor and over which the logs are fed, and a troughed conveyor extending at right angles to the main conveyor and onto which the logs are fed by the aforesaid drum, such troughed conveyor comprising side bars, bearing plates extending inward from each side bar and on which the ends of the logs bear, and an endless conveyor provided with troughs mounted between the bearing plates and into which the central portions of the logs fit so as to be carried upward thereby, and outwardly inclined extension to the bearing plates adapted to force the logs outward from the troughs of the conveyor as the logs are discharged.

7. A log transferring device comprising a main conveyor, a suitably driven high speed drum at the discharge end of the main conveyor and over which the logs are fed, and a troughed conveyor extending at right angles to the main conveyor and onto which the logs are fed by the aforesaid drum, such troughed conveyor comprising side bars, bearing plates extending inward from each side bar and on which the end portions of the logs bear, and an endless trough conveyor mounted between the bearing plates and into which the central portions of the logs fit so as to be carried upward thereby, upper and lower channel guide rollers carried by the endless conveyor, and means for guiding the rollers as they pass around the upper end of the conveyor from the upper channel guide into the lower channel guide.

WILLIAM HENRY WHARTON.